United States Patent Office 3,270,069
Patented August 30, 1966

3,270,069
METHOD FOR PREPARING AROMATIC FLUORIDES
George Andrew Olah, Sarnia, Ontario, Canada, assignor to The Dow Chemical Company, Midland, Mich., a corporation of Delaware
No Drawing. Filed Aug. 28, 1961, Ser. No. 134,126
5 Claims. (Cl. 260—650)

The present invention relates to the preparation of aromatic fluorides. Direct aromatic electrophilic fluorination is not possible due to the inability of fluorine to form a cation. Known methods of preparing fluoro aromatics generally use the diazotation of primary aromatic amines in anhydrous hydrogen fluoride or the thermal decomposition of complex fluoro diazonium salts (Schiemann reaction).

There is a method for preparing alkyl fluorides, by decomposing alkyl fluoroformates in the presence of pyridine or boron fluoride (S. Nakanishi, T. C. Myers and E. V. Jensen, J. Am. Chem. Soc., 77, 3099, 5033 (1955); G. A. Olah and S. J. Kuhn, J. Org. Chem., 21 1319 (1956)). However, attempts to apply this method to aryl fluoroformates with the objective of preparing aromatic fluorine compounds, encountered unexpected difficulties. Instead of simple decarboxylation, carbonyl fluoride is eliminated in a bimolecular reaction, the main reaction product being diphenyl carbonate

All attempts using various catalysts and bases gave substantially the same result.

It has now been found that aromatic fluorides can be prepared by thermally decomposing an aryl thiolfluoroformate (prepared in the manner of my copending application Serial No. 134,079, filed even date herewith). Good results have been obtained when the reaction is carried out at from about 100° to about 200° C. and when reasonable under reflux conditions. In any event the reaction is carried out until the evolution of carbonyl sulfide (COS) ceases. The reaction usually takes up to about 24 hours at atmospheric reflux conditions. In most instances yields of over 75% and conversions of over 15% have been obtained although it is probable that higher conversion can be obtained when more is understood about the parameters of the reaction.

Various attempts to increase the yields by employing Friedel Crafts catalysts and/or basic catalysts (bases) to facilitate the reaction resulted in production of carbonyl halides and intermediate dithiolphenyl carbonates which upon continued heating further decomposed to aryl sulfide and carbonyl sulfide (COS).

It is to be understood that substantially any aromatic thiolfluoroformate can be employed in accordance with the present invention. Thus, one can use the phenyl, the alkyl and halo-substituted phenyl thiolfluoroformates such as, for example, phenylthiolfluoroformate, p-chlorophenylthiolfluoroformate, p - fluorophenylthiolfluoromate and the like. These compounds can be prepared in accordance with the method set forth in my copending application Serial No. 134,079, for example by reacting an aromatic thiolchloroformate with anhydrous hydrogen fluoride at from —20° to about 20° C.

The following examples illustrate the present invention but are not to be construed as limiting:

*Example 1*

Phenylthiolfluoroformate (100 grams) was heated under reflux (ca. 130° C.) at atmospheric pressure for 24 hours. At the end of this period fluorobenzene (phenyl fluoride) was distilled over to yield 11.0 grams representing a 23% conversion based on the starting formate and a 78% yield based on the converted formate.

*Example 2*

In the manner of Example 1 employing p-chlorophenylthiolfluoroformate in place of phenylthiolfluoroformate there was obtained 9.5 grams of p-chlorofluorobenzene. This represents a 17% conversion and an 81% yield of desired product. The atmospheric reflux temperature was ca. 150° C.

*Example 3*

In the manner of Example 1 employing p-fluorophenylthiolfluoroformate in place of phenylthiolfluoroformate there was obtained 10.3 grams of p-difluorobenzene representing a 19% conversion and an 83% yield. The atmosphere reflux temperature was ca. 130° C.

I claim:
1. A method for preparing aromatic fluorides which comprises thermally decomposing an aromatic thiolfluoroformate of the benzene selected from the group consisting of phenyl, alkylphenyl, and halo substituted phenylthiolfluoroformates series at a temperature of from about 100° C. to about 200° C. and removing the COS of reaction.
2. In the method of claim 1 wherein the reaction is carried out at the atmospheric reflux temperature.
3. In the method of claim 1 wherein said aromatic thiolformate is phenylthiolfluoroformate.
4. In the method of claim 1 wherein said aromatic thiolformate is p-chlorophenylthiolfluoroformate.
5. In the method of claim 1 wherein said aromatic thiolformate is p-fluorophenylthiolfluoroformate.

No references cited.

LEON ZITVER, *Primary Examiner.*

ALPHONSO D. SULLIVAN, *Examiner.*

S. H. BLECH, K. H. JOHNSON, K. V. ROCKEY,
*Assistant Examiners.*